April 15, 1930.   J. M. PESTARINI   1,755,073
DYNAMO ELECTRIC MACHINE
Filed Aug. 18, 1927
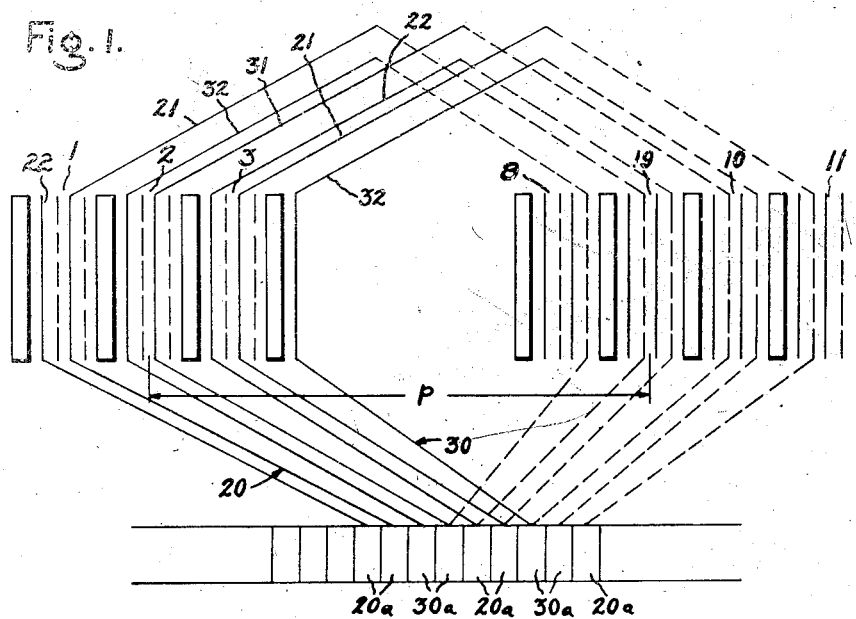
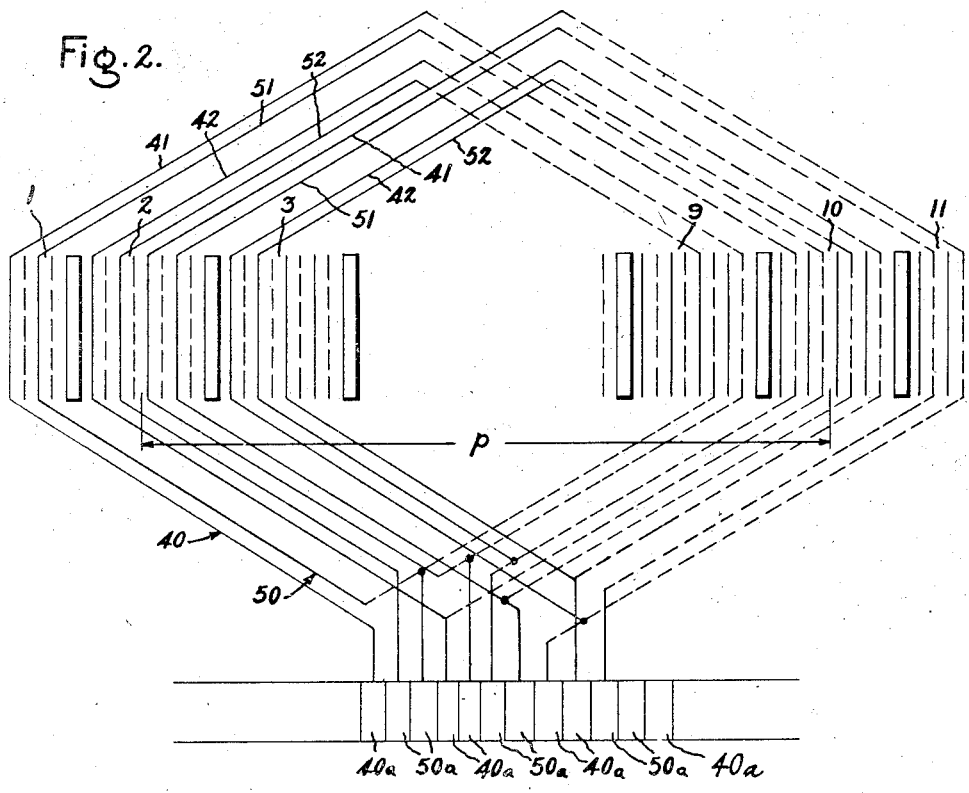
Inventor
Joseph M. Pestarini
by
His Attorney Patented Apr. 15, 1930

1,755,073

UNITED STATES PATENT OFFICE

JOSEPH M. PESTARINI, OF ST. OUEN, FRANCE, ASSIGNOR TO GENERAL ELECTRIC COMPANY, A CORPORATION OF NEW YORK

DYNAMO-ELECTRIC MACHINE

Application filed August 18, 1927, Serial No. 213,922, and in France December 16, 1926.

My invention relates to dynamo-electric machines and particularly to armature windings for such machines.

Armature windings have been made heretofore comprising a plurality of electrically parallel coils arranged in adjacent slots and connected between the same commutator segments for the purpose of reducing the inductive reactance of the winding elements short circuited during commutation, as shown for example in the U. S. Patent No. 1,502,931 to Whitaker of July 29, 1924. These windings have been made of electrically parallel long and short pitch coils, which was necessary in order to insure the slot conductors of each coil being in fields of equal flux density and the avoidance of circulating currents in the coils when they were short circuited during commutation. A disadvantage of such a construction is that the coils of different pitch connected in parallel provide current paths of unequal length and resistance which results in unequal current distribution between them.

The object of my invention is to provide an armature construction in which unequal current distribution will be avoided and that portion of the winding short circuited during commutation will be of low reactance. Equal current distribution is obtained in accordance with my invention, by connecting two independent armature windings of equal length and resistance to separate commutator segments, and employing brushes to connect the windings in parallel at the commutator. These windings each comprise coils of different pitch arranged in such relation that the coils short circuited during commutation extend through separate slots so that the coils are of as low inductive reactance as prior constructions having unsymmetrical winding elements connected in parallel within the armature winding, without the usual disadvantage of unequal current distribution.

My invention will be more fully set forth in the following description referring to the accompanying drawing, and the features of novelty which characterize my invention will be pointed out with particularity in the claims annexed to and forming a part of this specification.

In the drawing Fig. 1 is a diagram of an armature embodying my invention, and Fig. 2 is a modification thereof.

Referring to the drawing, the armature shown in Fig. 1 includes two indpendent windings 20 and 30 which are connected to separate commutator segments 20ª and 30ª respectively, and which extend through the armature slots numbered consecutively for convenience in explaining the construction. Each of these windings include long pitch coils of slightly greater pitch than the pole pitch $p$, indicated in the drawing, and short pitch coils of slightly less pitch than the pole pitch $p$.

The winding 20 is a lap winding comprising a series of alternately arranged long pitch coils 21 and short pitch coils 22 extending through odd numbered armature slots. In each of these slots is arranged a side of a long pitch coil 21 and an adjacent side of a short pitch coil 22 both of which form a part of the series of coils constituting the winding 20. The long pitch coil 21 extends from this slot through an odd numbered slot at a distance therefrom slightly greater than the pole pitch $p$. The short pitch coil 22 in the same slot extends through an odd numbered slot at a distance therefrom slightly less than the pole pitch. It will be noted that the sides of these coils which are in different slots are displaced an equal amount on opposite sides of a slot displaced from the slot in which their sides are adjacent an amount equal to the pole pitch. For example, in Fig. 1 a long pitch coil 21 and a short pitch coil 22 are arranged with their sides in slot 3, the other sides of these coils extending through slots 9 and 11 which are equidistant on each side respectively of an even numbered slot 10 displaced from the slot 3 a distance equal to the pole pitch $p$. The end connections of the coils 21 and 22 adjacent in the series of alternate coils are connected to the same commutator segment 20ª. The sides of coils 21 and 22 which are in the same slot, are connected to contiguous segments 20ª; and the other sides of these coils, which are in different slots, are connected to segments 20ª separated by pairs of segments 30ª.

The winding 30, which is similar to the winding 20, is also a lap winding comprising a series of alternately arranged long pitch coils 31 and short pitch coils 32 extending through even numbered armature slots. The side of a short pitch coil 32 and the side of a long pitch coil 31 are arranged adjacent in these slots, the other side of these coils being arranged in slots on each side of an odd numbered slot displaced a distance equal to the pole pitch from that in which the coil sides are adjacent. For example, in Fig. 1 a long pitch coil 31 and a short pitch coil 32 are arranged with their sides in slot 2, the other sides of these coils extending through slots 8 and 10 which are equidistant on each side respectively of an odd numbered slot 9 displaced from the slot 2 a distance equal to the pole pitch $p$. The end connections of the coils 31 and 32 adjacent in the series of alternately arranged coils are connected to the same commutator segment 30ª. The sides of coils 31 and 32 which are in the same slot are connected to contiguous segments 30ª; and the other sides of these coils, which are in different slots are connected to segments 30ª separated by pairs of segments 20ª. In order to avoid the necessity of crossing over the end connections leading to the commutator the segments 20ª and 30ª are arranged in alternate pairs.

The independent windings 20 and 30 are connected in parallel by the commutator brushes, which are preferably equal in width to four commutator segments, and as the windings 20 and 30 are symmetrical, equal current distribution between them is obtained. Any suitable brush wide enough to connect the windings 20 and 30 in parallel, short circuits portions of each of them simultaneously in parallel during commutation, and as the portions of the windings which are short circuited in parallel at the brushes extend through separate slots they are of comparatively low inductive reactance.

The armature shown in Fig. 1 has four armature conductors per slot, but it is contemplated that my invention be used in armatures having any suitable number of conductors per slot; for example, Fig. 2 is a diagram of an armature having eight conductors per slot. In this construction two independent symmetrical lap windings 40 and 50 are arranged in the armature slots with the coil sides of each adjacent the coil sides of the other in the top and in the bottom of the slots.

The winding 40 comprises a series of alternately arranged long pitch coils 41 and short pitch coils 42 which are connected to pairs of contiguous commutator segments 40ª separated by pairs of commutator segments 50ª connected to the winding 50. The sides on one side of long and short pitch coils adjacent in the series, forming the winding 40, are arranged in the same slot on each side of a slot conductor of the winding 50, and the other sides of these coils are arranged in non-adjacent slots displaced from the first mentioned an amount respectively greater and less than the pole pitch. For example, in Fig. 2 the sides of long and short pitch coils 41 and 42 are in slot 2 and separated by the side of a coil 52 of the winding 50. The long pitch coil 41 extends from the slot 2 to the slot 11, and the short pitch coil 42 extends from the slot 2 to the slot 9. It will be noted that the slots 9 and 11 are equidistant from the slot 10 which is displaced from the slot 2 a distance equal to the pole pitch. The ends of the coils adjacent the commutator including those conductors in the same slot are connected to contiguous commutator segments 40ª, and the ends of the coils including inductors in separate slots are connected to segments 40ª separated by a pair of contiguous segments 50ª.

The winding 50 is similar to the winding 40 and also includes long pitch coils 51 and short pitch coils 52 arranged alternately in series, the sides of which extend between those of winding 40. The long and short pitch coils 51 and 52 are arranged in the same relation to the sides of winding 40 as the coils 41 and 42 are arranged relative to the inductors of winding 50, and are connected to pairs of commutator segments 50ª which are separated by pairs of segments 40ª connected to the winding 40.

The windings 40 and 50 are connected in parallel by the brushes which are preferably equal in width to four commutator segments. These windings provide current paths of equal resistance so that there is an equal distribution of current between them. Furthermore, portions of each of the windings 40 and 50 are short circuited in parallel at the same time during commutation and as they are in different slots low inductive reactance of the coils being commutated is obtained.

Although I have set forth a specific embodiment of my invention as applied to a multiplex lap winding it is apparent that my invention is applicable to a multiplex wave winding, and that modifications thereof may be made by those skilled in the art. I desire it to be understood therefore, that my invention is not limited to the particular arrangement shown and described, and I intend in the appended claims to cover all modifications which do not depart from the spirit and scope of my invention.

What I claim as new and desire to secure by Letters Patent of the United States, is:—

1. A dynamo-electric machine comprising an armature having straight slots extending entirely across the face thereof, a commutator, and two independent windings connected to separate commutator segments, each of said windings comprising long pitch coils and short pitch coils arranged in said straight slots, each of said coils being connected to said commutator.

2. A dynamo-electric machine comprising an armature having straight slots extending entirely across the face thereof, a commutator, and two independent windings connected to separate commutator segments, each of said windings comprising long pitch coils and short pitch coils arranged alternately in series in said straight slots, each of said coils being connected to said commutator.

3. A dynamo-electric machine comprising an armature having straight slots extending entirely across the face thereof, said armature having a commutator and two independent windings comprising long pitch coils and short pitch coils, the conductors on one side of said long pitch coils and short pitch coils being arranged in the same armature slots, each of said coils being connected to said commutator, and the conductors on the other side of the same coils being arranged in different slots.

4. A dynamo-electric machine comprising an armature, said armature having a commutator and two independent windings comprising long and short pitch coils, the conductors on one side of said long and short pitch coils being arranged in the same armature slots, each of said coils being connected to said commutator, and the conductors on the other side of the same coils being arranged in different slots, one of said windings being connected to pairs of contiguous commutator segments separated by pairs of contiguous segments connected to the other winding.

5. A dynamo-electric machine comprising an armature, said armature having a commutator and two independent windings comprising long and short pitch coils arranged alternately in series, the conductors of one side of said long and short pitch coils being arranged in the same armature slots, each of said coils being connected to said commutator, and the conductors on the other side of the same coils being arranged in different slots, one of said windings being connected to pairs of contiguous commutator segments separated by pairs of contiguous segments connected to the other winding.

In witness whereof, I have hereunto set my hand this 27th day of July, 1927.

JOSEPH M. PESTARINI.